A. B. CALKINS.
INTERNAL COMBUSTION ENGINE.
APPLICATION FILED FEB. 8, 1916.
1,273,029.
Patented July 16, 1918.
4 SHEETS—SHEET 2.
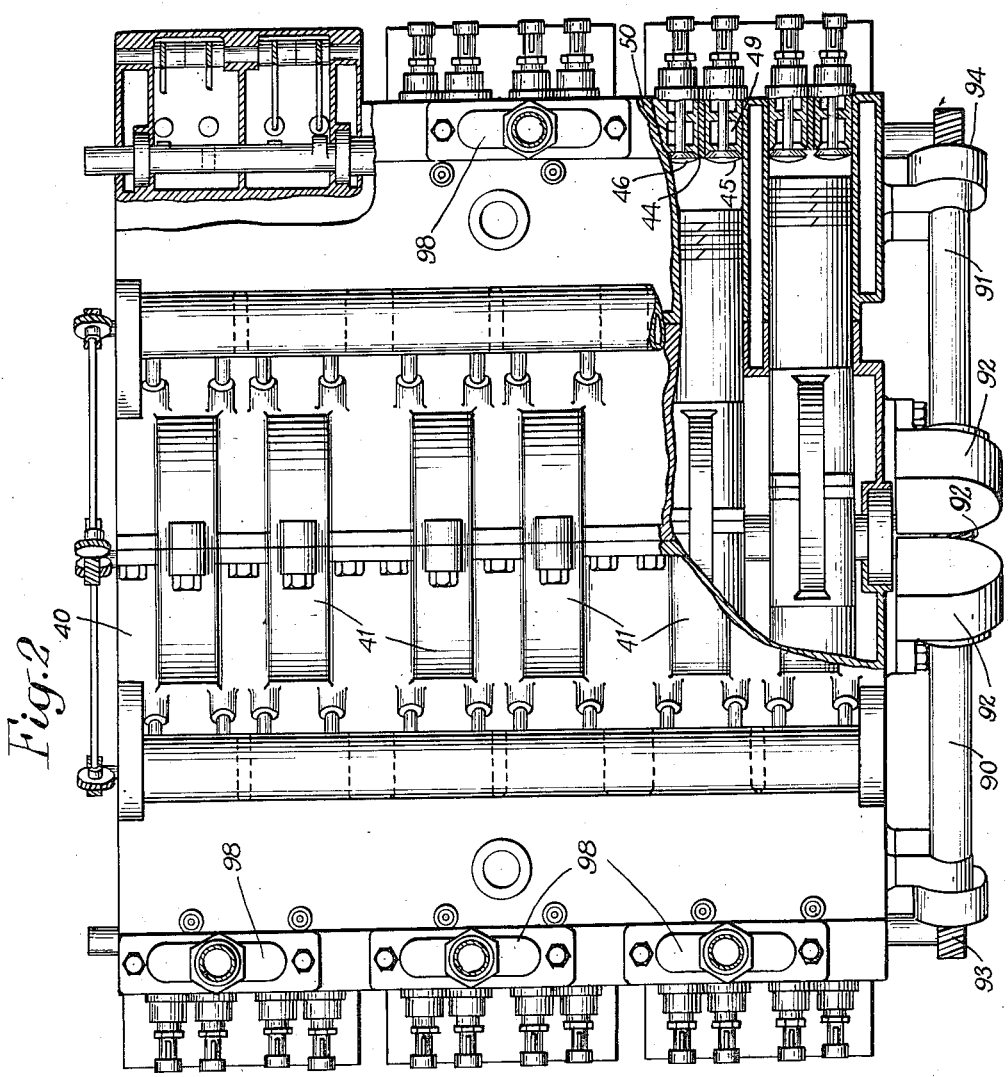
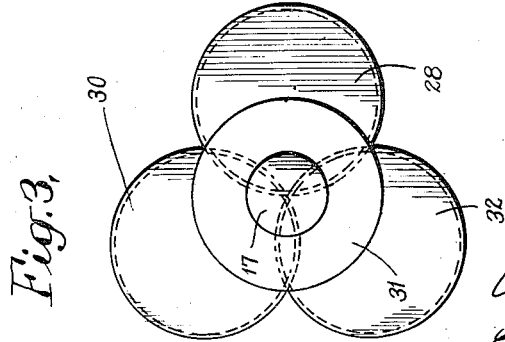
INVENTOR
Almon B. Calkins
BY E. W. Marshall
ATTORNEY

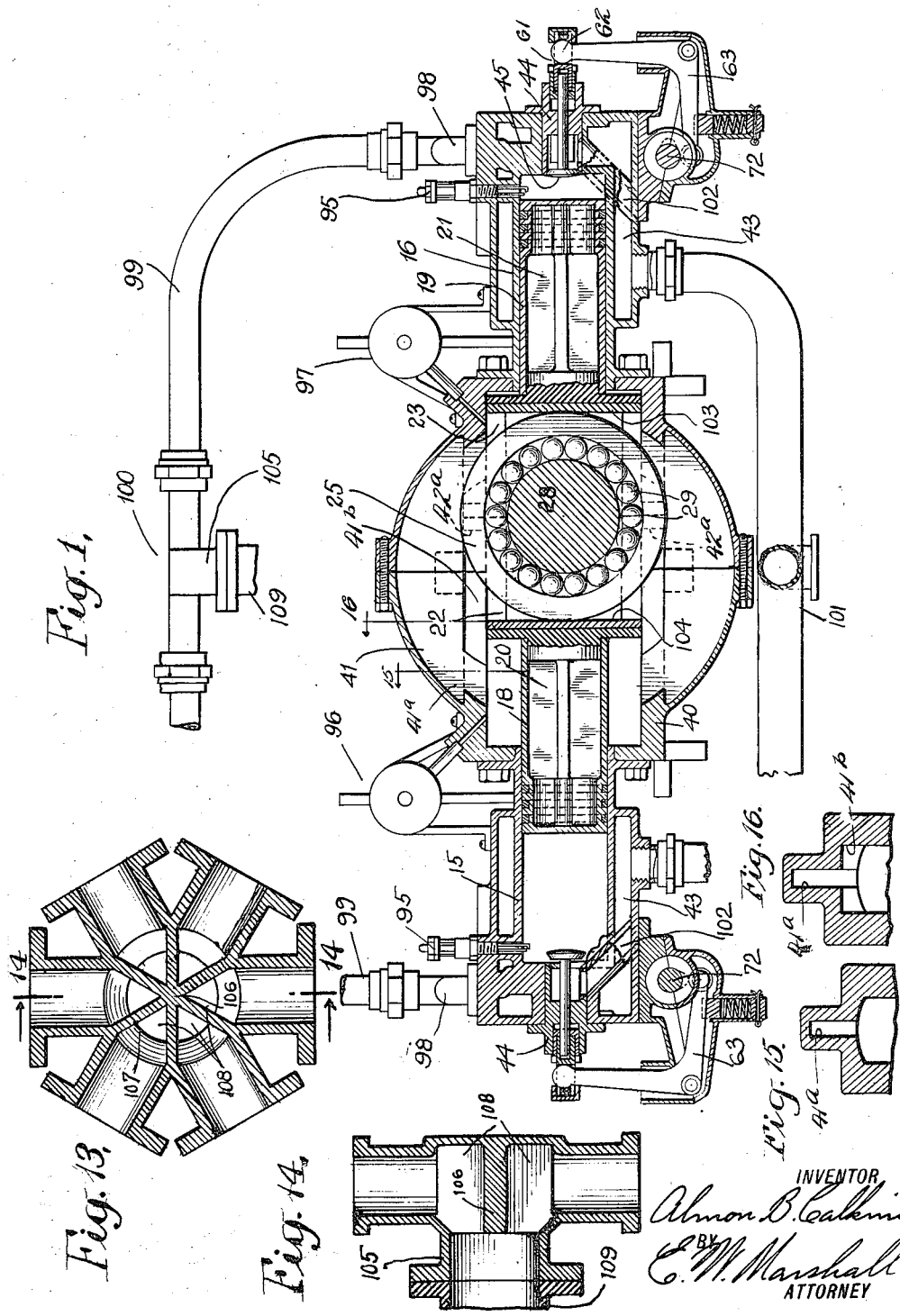

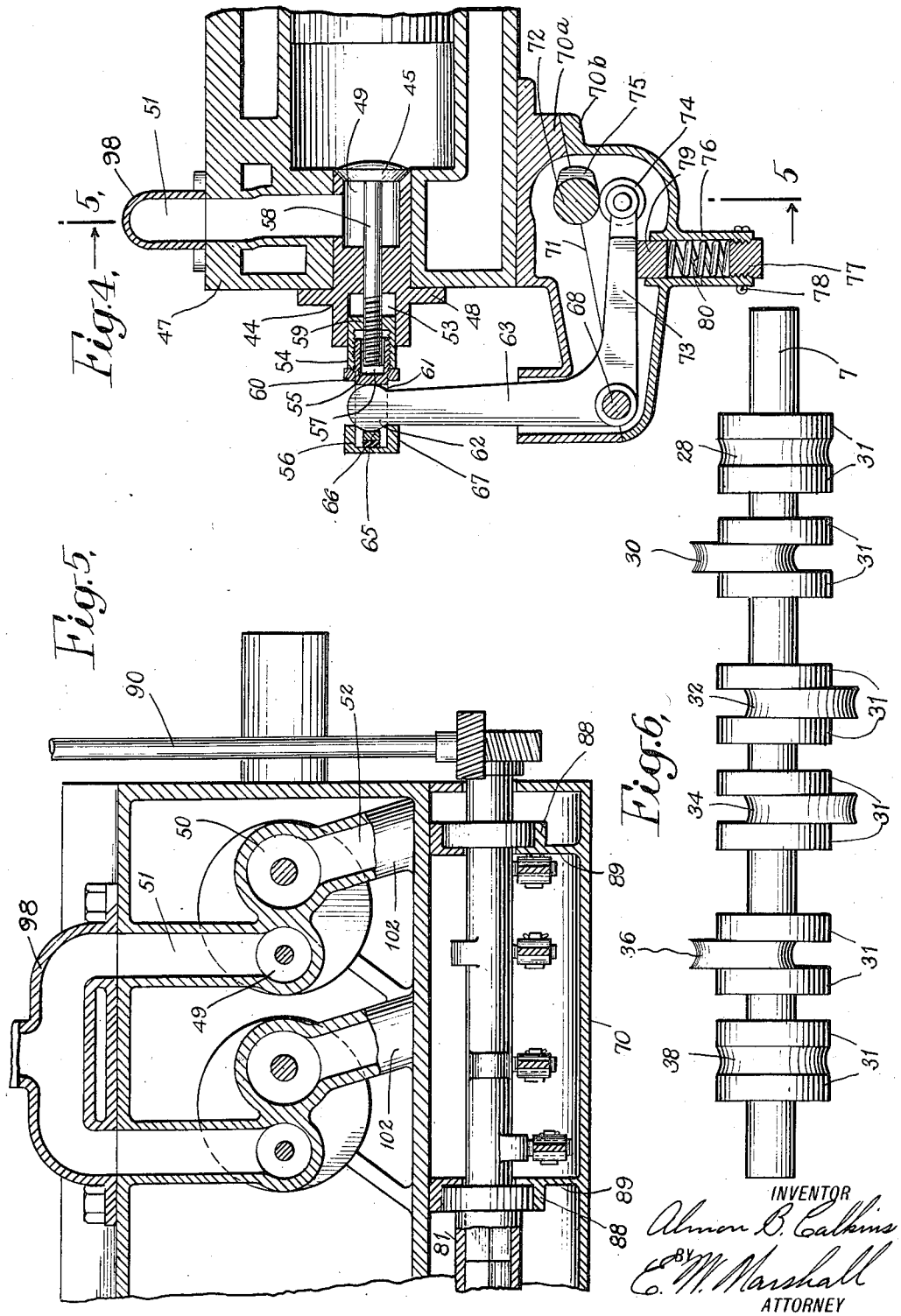

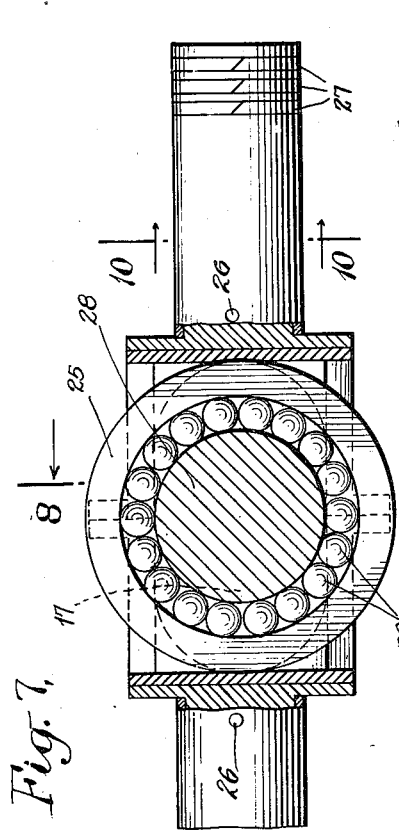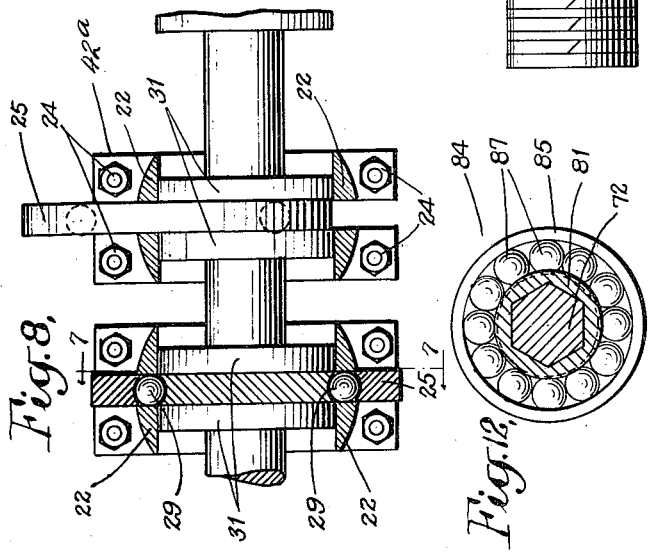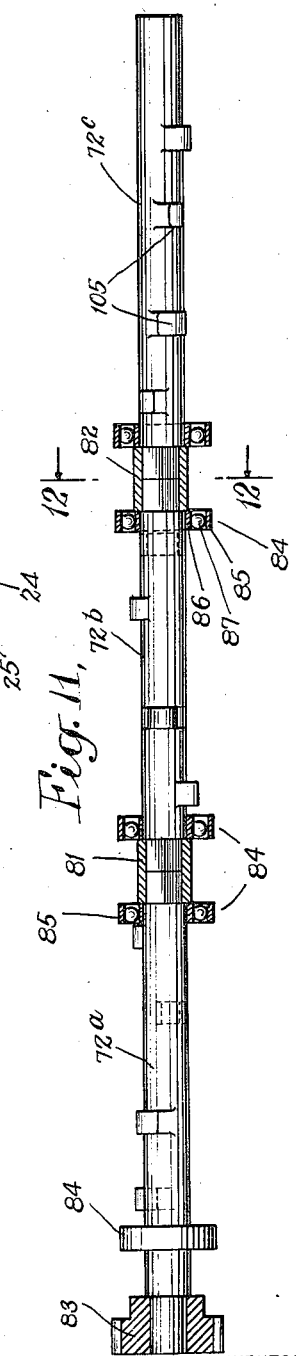

UNITED STATES PATENT OFFICE.

ALMON B. CALKINS, OF WHITE PLAINS, NEW YORK, ASSIGNOR OF ONE-THIRD TO DAVID H. McFALLS AND ONE-THIRD TO THOMAS E. IREDALE, BOTH OF WHITE PLAINS, NEW YORK.

INTERNAL-COMBUSTION ENGINE.

1,273,029.   Specification of Letters Patent.   Patented July 16, 1918.

Application filed February 8, 1916. Serial No. 76,896.

*To all whom it may concern:*

Be it known that I, ALMON B. CALKINS, a citizen of the United States, and a resident of White Plains, Westchester county, and State of New York, have invented certain new and useful Improvements in Internal-Combustion Engines, of which the following is a specification, reference being had to the accompanying drawings, forming a part thereof.

My invention relates to internal combustion engines and has special reference to multi-cylinder engines such as are adapted for aviation or automobile service.

One of the principal objects of my invention is to provide an engine that shall avoid the vibrations and stresses incident to the use of connecting rods by eliminating such members and utilizing a perfectly symmetrical structure and one in which the forces are uniformly distributed and balanced with reference to the crank shaft; in other words, I provide an engine which develops a plurality of impulses at very frequent intervals which impulses act alternately in an over-shot and under-shot direction relative to the crank shaft, thus balancing the forces exerted upon the shaft and relieving the bearings of strains to which they are usually subjected.

Another object of my invention is to provide a simple and compact engine for the aforesaid purpose in which the center of the shaft and the center of gravity are substantially coincident and in which the driving forces are particularly well balanced.

Another object of my invention is to provide a simple and durable piston structure that shall be relatively light and at the same time capable of transmitting relatively large forces.

Another object is to provide an engine that shall be adapted to operate at very high, as well as low speeds and that shall nevertheless be light relative to the power developed and occupy a relatively small space particularly in an axial direction.

Still another object is to provide an engine having a large number of cylinders in which the friction losses are particularly small, in fact, almost negligible.

Another object is to provide an improved valve operating mechanism that shall be simple in construction and effective in operation.

Other objects of my invention will be set forth hereinafter, and in order that my invention may be thoroughly understood I will now proceed to describe the same in the following specification and then point out the novel features thereof in appended claims.

Referring to the drawings:

Figure 1 is a transverse sectional elevation taken through the center of one pair of cylinders, of a multi-cylinder engine arranged and constructed in accordance with my invention.

A plan view of the same with a portion of the casing broken away and some of the cylinders appearing in section, is shown in Fig. 2.

The relation between the several groups of pistons of the engine is clearly indicated in Fig. 3, which is an end elevation of the main crank shaft of the engine.

Fig. 4 is a sectional view showing a single cylinder with its valve mechanism, drawn to a larger scale.

Fig. 5 is a sectional view taken on the line 5—5 of Fig. 4.

Fig. 6 is a plan view of the crank shaft of the engine.

Fig. 7 is a sectional view through the crank shaft showing the operative connection between one pair of pistons and the shaft and taken on the line 7—7 of Fig. 8.

Fig. 8 is a sectional elevation showing the operative connections between two pairs of pistons and the shaft, taken in a plane corresponding to the line 8—8 of Fig. 7.

Fig. 9 is a partial plan view of one group of connected pistons and

Fig. 10 is a sectional elevation on the line 10—10 of Fig. 7.

Fig. 11 is a partial plan view of one of the valve operating cam shafts with the couplings between sections and the driving gear shown in section.

Fig. 12 is a transverse section, taken on the line 12—12 of Fig. 11.

The central member of the intake manifold is shown in detail in Figs. 13 and 14.

Figs. 15 and 16 are detailed sections through the crank case taken respectively on the lines 15 and 16 of Fig. 1.

The embodiment of my invention which is illustrated comprises one group of cylinders 15 cast *en bloc* and a second group of cylinders 16 which, in the preferred arrangement, are directly opposed to the cylinders 15 relative to the crank shaft 17 of the engine. One set of opposite cylinders constitutes a pair and each pair is provided with a piston structure comprising a pair of piston sleeves 18 and 19 mounted on projections 20—21 of a pair of yokes 22—23. The yokes are secured together, by bolts 24, or are otherwise suitably attached, with the projections 20—21 extending outwardly in opposite directions. The two yokes when secured together form a guide frame or box in which a power transmitting ring 25 is disposed.

The projections 20—21 have radiating ribs or webs which give them the form of spiders in cross-section, the sleeves 18 and 19 being closely fitted onto the projections and held in position by pins 26.

The sleeves are closed at their outer ends and preferably have thicker walls near their closed ends, which are grooved to receive a plurality of piston rings 27.

The transmission ring 25 is of considerable width as measured radially and its outside diameter is such as to fit freely into the guide frame or box formed by the yokes. The ring 25 is mounted upon a crank pin 28 of the crank shaft 17, a plurality of balls or rollers 29 being interposed to form a substantially frictionless bearing.

The crank shaft 17 of the engine comprises in addition to the crank pin 28, a plurality of crank pins 30—32—34—36—38, one being provided for each pair of cylinders. As clearly shown in Fig. 6, the shaft has a number of collars 31 arranged in pairs, one being on each side of each crank pin. Furthermore, the crank pins are grouped in pairs, pins 28 and 30, 32 and 34, 36 and 38, being spaced apart in groups with the crank pins of each group relatively close together.

The positioning of the crank pin about the axis of the shaft is clearly indicated in Fig. 3, pins 28, 30 and 32 being circumferentially spaced by 120 degrees and the eccentrics 28 and 38, 30 and 36, 32 and 34, being similarly positioned. While the embodiment of the invention illustrated comprises two groups of six cylinders each and a six-throw crank, my invention is of course not limited to any particular number of cylinders. However on account of the overshot and undershot action, as more fully pointed out in connection with the operation of the machine, my invention lends itself with great ease and facility to a large number of cylinders because of the fact that the forces exerted on the crank shaft are well balanced and as the number of cylinders is increased the number of impulses per revolution is increased and the torque made more constant and uniform.

The crank shaft possesses a number of particularly desirable and novel features which will be understood by comparison. Crank shafts as ordinarily formed have relatively long crank pins and with engines of the V-type having twelve cylinders, for example and provided with a six throw crank and twelve connecting rods, the crank pins are double the usual length to accommodate two connecting rods side by side. Crank shafts constructed thus are necessarily heavy and large because the strains are applied to the long pins at a distance from the central section of the crank shaft. On the other hand, as clearly shown in Figs. 1 and 6, the crank pins of my improved shaft are short and have a material section lying within the central section of the shaft. The pins are furthermore, large relative to the shaft and are integral with the concentric collars which make the structure very rigid.

The cylinders 15 are preferably cast in one unit and the cylinders 16 which are similarly cast, are bolted or otherwise suitably fixed on opposite sides of a two-part crank casing 40 which has a plurality of hollow projections 41 having guide spaces 41$^a$ for the power transmitting rings 25. The spaces are enlarged at 41$^b$ to receive the lugs 42$^a$ of the yoke. Attention is particularly directed to the fact that the structure is symmetrical not only with reference to a vertical but also with reference to a horizontal axis, the crank casing 40 being centrally interposed between the groups of cylinders.

Furthermore, as shown in Figs. 15 and 16, the crank casing guides the piston yoke as it moves back and forth with the pistons.

The cylinders are provided with water jackets as indicated at 43 and valve cages 44 extend into the ends of the cylinders. The cages are adapted to receive valves 45—46 which, in the structure illustrated, are of the puppet type. Each of the valves is similarly operated, the valve mechanism being clearly shown in Figs. 1, 4, 5 and 11, while the arrangement of the valve cage in the cylinder is clearly illustrated in Figs. 1, 2, and 4. Since the mechanisms are alike it is only necessary to describe one, and special reference may now be had to Figs. 1 and 4.

Two valve cages 44 are set into the cylinder head 47 and each cage is provided with a flange 48 which engages the head and determines its position therein. The cages have corresponding recesses 49—50 which communicate respectively with the intake manifold 51 and one of the exhaust ports 52. The outer end of each cage is provided with a recess 53 which is adapted to receive a thimble 54.

The thimble is arranged to slide in the recess 53 and is internally threaded to receive the threaded end 55 of a stirrup 56. The projection 55 of the stirrup is recessed at 57 to extend freely over the screw-threaded stem 58 of the valve, the thimble 54 being provided with a tapped hole 59 and screwed onto the stem 58 as illustrated. The arrangement of parts is such that the position of the stirrup may be readily adjusted for the purpose of setting the valve. The lock nut 60 is threaded onto the stirrup projection 55 and is backed against the end of the thimble after the proper adjustment has been effected.

The stirrup has a slot 61 to receive the hardened disk-shaped end 62 of a bell crank lever 63. The outer end of the stirrup is transversely slotted as indicated to receive a small block 65 which is yieldingly pressed against the head 62 by a soft rubber filler or plug 66 which is held in place by a cap 67. A spring may of course be utilized in place of the rubber if desired, the function of the rubber being to constantly press the small block 65 against the head 62.

The bell crank levers 63 of which there is one for each valve, are mounted on a shaft 68 in a cam shaft casing 70 which is attached to the bottom of the cylinder casting near its outer end and is divided into sections 70$^a$ and 70$^b$ in a plane indicated by the line 71, which extends through the shaft 68 and a cam shaft 72. Each of the bell crank levers 63 has an arm 73 which extends adjacent to the cam shaft 72 and is preferably provided with a roller 74 to coöperate with a cam 75 on the cam shaft.

The section 70$^b$ of the cam shaft casing is formed to provide a plurality of sleeves 76, one for each of the bell crank levers 63. In the outer end of each sleeve is a plug 77 which is preferably threaded into position and held in place by a cotter pin 78. A sliding plug 79 is located in the opposite end of the sleeve and transmits the force of the spring 80 against the bell crank arm 73 with which it is held in engagement.

As shown in Fig. 11, the cam shaft 72 is preferably formed in sections 72$^a$, 72$^b$, 72$^c$ to simplify the manufacture and permit standard ball bearing members to be introduced, which sections are joined by sleeves 81, 82, the sleeve openings and the ends of the sections which extend into the sleeves being hexagonal or of some other suitable shape to coöperate and prevent the independent rotation of the sections. A driving gear 83 is affixed to the outer end of the section 72$^a$.

The sections are supported near their respective ends by frictionless bearings 84, each comprising, as shown in Figs. 11 and 12, an outer ring 85, an inner ring 86, and interposed balls or rollers 87. The outer rings 85 are set into sockets 88 in webs 89 of the cam shaft casing 70.

There are of course two cam shafts one for each group of cylinders, and the two shafts are respectively actuated by shafts 90 and 91, which are connected to the engine shaft by suitable gears indicated at 92 and to the cam shafts by gears 93 and 94, as shown in Fig. 2.

The spark plugs are indicated at 95. At 96 and 97 I have indicated means such as automatic lubricating cylinders, for introducing oil at predetermined intervals, under pressure, into the engine cylinders and into the crank casing.

In order to distribute the fuel among the several cylinders with substantial uniformity and avoid the possibility of any one of the cylinders robbing the others, I have connected the cylinders in pairs by U-tubes or secondary manifolds 98 and supply the U-tubes through branches 99 of the manifold 100. The manifold, as clearly shown in Figs. 13 and 14, comprises a central member 105 to which the carbureter is attached. This member has a central post 106 from which deflecting plates 107 extend radially outward and divide the space within into a plurality of chambers 108. These chambers communicate directly with the carbureter indicated at 109 and are connected with the respective U-tubes or secondary manifolds 98 by the branches 99. With this arrangement there is no tendency for one cylinder to take from more than one other, if any.

The water jackets 43 are supplied through piping such as indicated at 101.

102 indicates the exhaust ports.

Attention is directed to the fact that the forces by which the main engine shaft is turned are always acting in pairs, or couples, the forces of each couple working at the same time on opposite sides of the shaft center. In other words, when an impulse occurs in one of the cylinders on one side it is closely followed by an impulse in one of the cylinders on the opposite side. The effect will be readily understood by comparing the forces from one set of cylinders to an undershot wheel, the forces exerted by the opposite set of cylinders being comparable to those applied to an overshot wheel.

The series of impulses which are not more than 60 degrees apart obviously produce a substantially constant torque on the engine shaft and make the action of the engine, as a whole, comparable to an electric motor.

It is this substantial equality in the distribution of forces as well as in the distribution of weight about the axis of the shaft which permits the engine to be made very light relative to the power developed.

Attention is furthermore directed to the fact that in the valve operating mechanism the soft rubber plug 66 serves the purpose of holding the valve tight shut until it is positively opened by the cam shaft. The "cracking" of the valve with a loss of vacuum is thus avoided.

On account of the balanced forces exerted upon the shaft the bearings are largely relieved of stress and wear.

The rings 25 on account of their weight and size and by reason of the fact that each ring is continuously rotating in the orbit of its crank pin, have a very marked flywheel effect which renders the use of any other flywheel unnecessary.

In operation, when one of the pistons 19, for example, is moving outwardly on its working stroke, the opposite piston 18 is moving inwardly on either its exhaust or its compression stroke, depending upon its setting.

The forces are transmitted from the surfaces 103 and 104 of the piston yokes to the ring 25 and inasmuch as the ring is relatively wide and unyielding it distributes the forces among a number of the balls or rollers 29 which in turn act upon the eccentric 28 and turn the shaft 17.

The width of the power transmission ring furthermore, serves to permit a ball race of relatively small diameter and thus materially reduces the surface speed of the balls or rollers while at the same time it enables the engine shaft to rotate without interfering with the yokes 22 and 23. Cam shafts 72 are operatively connected to the crank shaft as already explained, and as they turn, the cam projections 75 thereon actuate the bell crank levers 63 so as to open the valves 45 and 46 at the proper time.

Attention is directed to the fact that there are a large number of cylinders arranged in a very compact structure which occupies a relatively small space for the power developed.

Furthermore, the rings 25 are free to roll on the surfaces 103 and 104 with which they engage and hence the friction in the connection is reduced to a negligible quantity.

In the structure illustrated the forces upon the shaft 28 are substantially balanced and consequently the shaft bearings are relieved of usual strains so that they will wear without replacement for an indefinite period.

Attention is directed to the fact that the spring which holds the valve closed acts upon the bell crank lever substantially opposite the cam shaft instead of being located around the valve stem in accordance with the usual arrangement, thereby making it most effective in holding the roller against the cam especially at high speeds.

Furthermore, there is no lost motion between the cam and the spring. The valve is nevertheless prevented from cracking as already explained, by the rubber block.

The embodiment of my invention which is shown and described, is particularly well adapted for aviation service but my invention is by no means restricted to any particular field of usefulness, and furthermore, it is evident that structural variations may be effected within the spirit and scope of my invention. I therefore intend that only such limitations be imposed as are indicated in appended claims.

What I claim is:

1. An engine comprising a pair of spaced cylinders in alinement, an interposed crank shaft at right angles to the center line of the cylinders and having a pair of spaced concentric collars or enlargements forming circular guide plates, an eccentric integral crank disk substantially equal in diameter to the circular guide plates, a unitary ring of material radial thickness surrounding the crank disk and fitted between the guide plates, an interposed rolling bearing between the crank disk and the unitary driving ring, a rigid piston structure comprising a frame having parallel actuating surfaces adapted to receive the driving ring between them, piston projections extending outwardly from the surfaces at right angles thereto, and a pair of spaced connecting members adapted to receive the concentric collars or enlargements of the shaft between them.

2. An engine comprising a pair of spaced cylinders in alinement, an interposed crank shaft at right angles to the center line of the cylinders and having a pair of spaced concentric collars or enlargements forming circular guide plates, an eccentric integral crank disk substantially equal in diameter to the circular guide plates, a unitary ring of material radial thickness surrounding the crank disk and fitted between the guide plates, an interposed rolling bearing between the crank disk and the unitary driving ring, a rigid piston structure comprising a frame having parallel actuating surfaces adapted to receive the driving ring between them, piston projections extending outwardly from the surfaces at right angles thereto, a pair of connecting members spaced to receive the concentric collars or enlargements of the shaft between them, and slotted or bifurcated to fit on the respective sides of and form guides for the eccentric crank disk and the driving ring.

3. An engine comprising a crank shaft having a plurality of concentric collars or enlargements forming circular guide plates and spaced at short distances apart in pairs, eccentric integral crank disks substantially equal in diameter to the concentric collars or enlargements and interposed between them, a unitary driving ring rotatably mounted on each of said integral crank disks, and a piston structure comprising a yoke having an opening to receive the shaft and the concentric shaft collars, and a slot at right angles to the opening adapted to receive the ring.

4. An engine comprising a plurality of cylinders arranged in two opposed groups, an interposed crank casing between the groups and having guideways formed therein, a unitary piston structure for each pair of opposed cylinders having a central yoke, a crank shaft having a plurality of short crank pins, and a ring rotatable on each pin, said ring being fitted into and held in position by the central yoke and extending into the guideways of the crank casing.

5. An engine comprising a plurality of cylinders arranged in two opposed groups, an interposed crank casing between the groups having guideways formed therein, a unitary piston structure for each pair of opposed cylinders having a central yoke, a crank shaft having a plurality of short crank pins, and relatively massive power transmitting rings rotatable on the crank pins and adapted to revolve about the shaft center and conjunctively act as a flywheel; said rings being fitted into the central yoke of the piston structure and extending into the guideways of the casing.

6. In an engine, the combination with a piston structure composed of oppositely extending piston projections having a pair of substantially parallel spaced transmission surfaces, two pairs of parallel tie bars extending longitudinally of the structure between said surfaces and constituting a guide frame, of a shaft extending through the guide frame between the transmission surfaces and having a pair of spaced concentric enlargements fitted between opposite bars of said pairs, an eccentric between the enlargements, and a transmission ring rotatively mounted on the eccentric, diametrically fitted between the transmission surfaces of the piston projections and axially fitted between the bars of said pairs.

7. An engine comprising a pair of opposed alining cylinders, a double piston structure having a central guide frame with a slot in the central plane of the structure, a driving ring axially fitted into the slot and adapted to roll between its opposite end surfaces, a shaft extending through the ring and having an eccentric on which the ring is rotatively mounted, and concentric enlargements adjacent to the eccentric on either side and guided by the frame.

8. An engine comprising a shaft, a pair of opposite cylinders, a piston structure composed of outwardly extending pistons and a central guide block having a rectangular axial opening, and a slot extending in a plane at right angles to the center of the shaft, said shaft having an eccentric, a ring rotatively mounted thereon and fitted into the slot in the piston structure, and concentric enlargements at the respective sides of the eccentric and fitted into the rectangular opening of the piston structure.

9. In an engine transmission mechanism, a shaft comprising a pair of concentric cheeks or enlargements, and an interposed eccentric portion substantially equal in diameter to the concentric cheeks or enlargements, a pair of alining cylinders on opposite sides of the shaft and a piston structure having a frame with parallel sides spaced to fit on the concentric cheeks or enlargements of the shaft, piston projections extending into the opposed cylinders and a driving ring rotatively mounted on the eccentric portion of the shaft and fitted into the piston frame diametrically between its ends and axially between the parts thereof.

10. In an engine, the combination with a shaft having a pair of concentric enlargements and a relatively short interposed eccentric portion, of a piston frame having a slot corresponding in width to the length of the eccentric portion of the shaft, and a transmission ring rotatively mounted on the eccentric portion of the shaft and fitted into the slot, said piston frame having an axial opening into which the concentric enlargements of the shaft are fitted.

In witness whereof, I have hereunto set my hand this 5th day of February, 1916.

ALMON B. CALKINS.